T. CRAWFORD.
FRUIT SLICING MACHINE.
APPLICATION FILED NOV. 13, 1917.
1,259,213.
Patented Mar. 12, 1918.
2 SHEETS—SHEET 1.
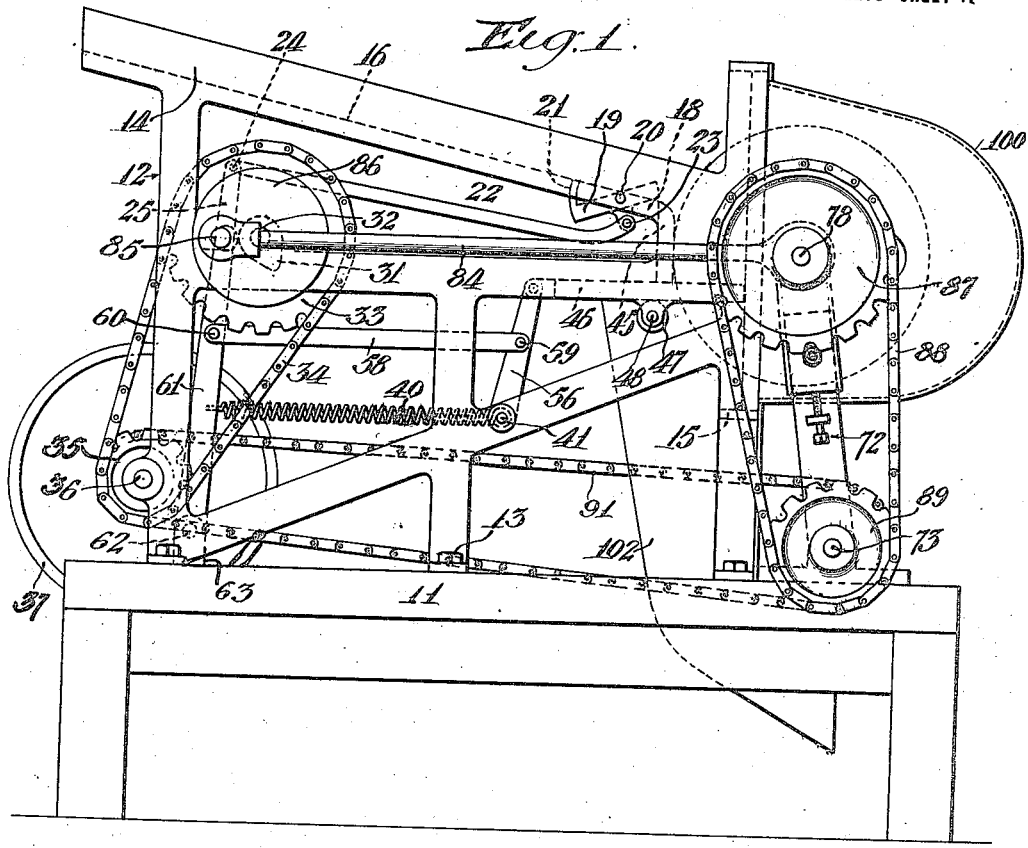
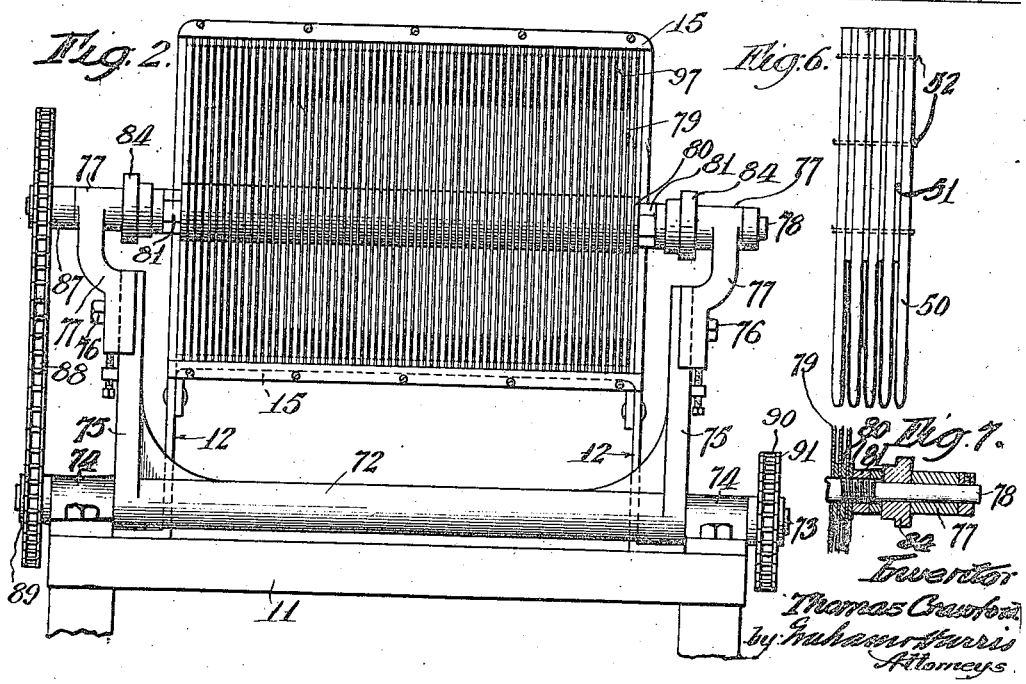

T. CRAWFORD.
FRUIT SLICING MACHINE.
APPLICATION FILED NOV. 13, 1917.
1,259,213.
Patented Mar. 12, 1918.
2 SHEETS—SHEET 2.
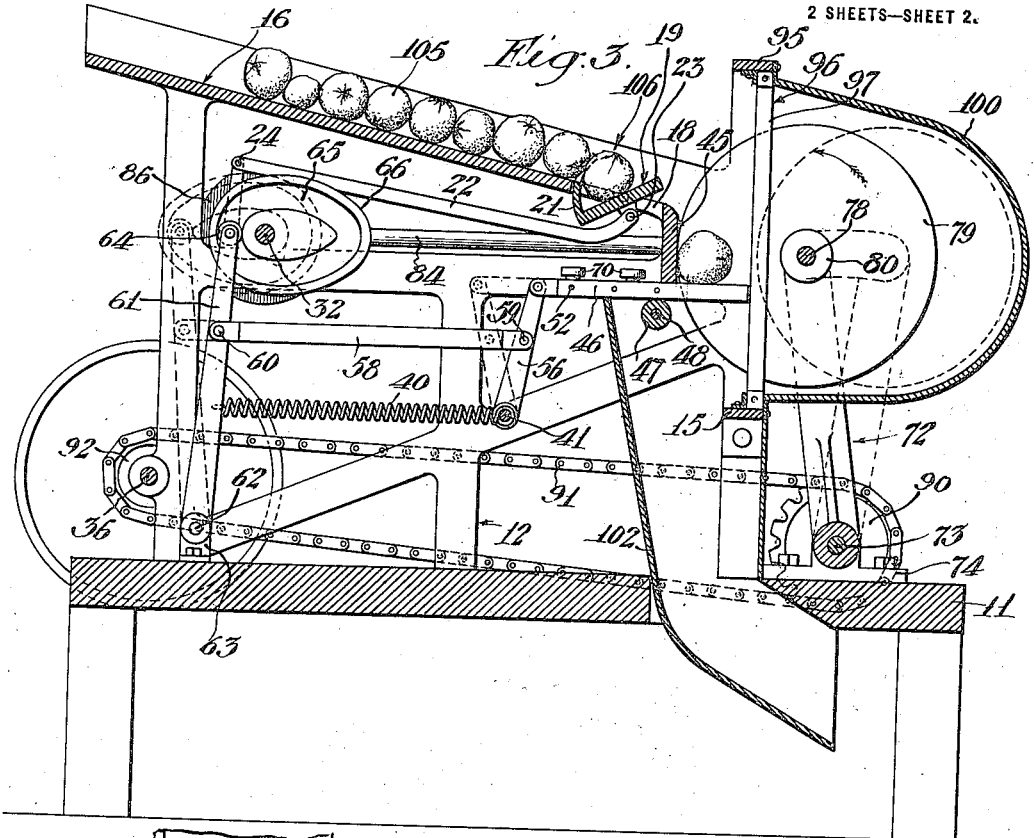
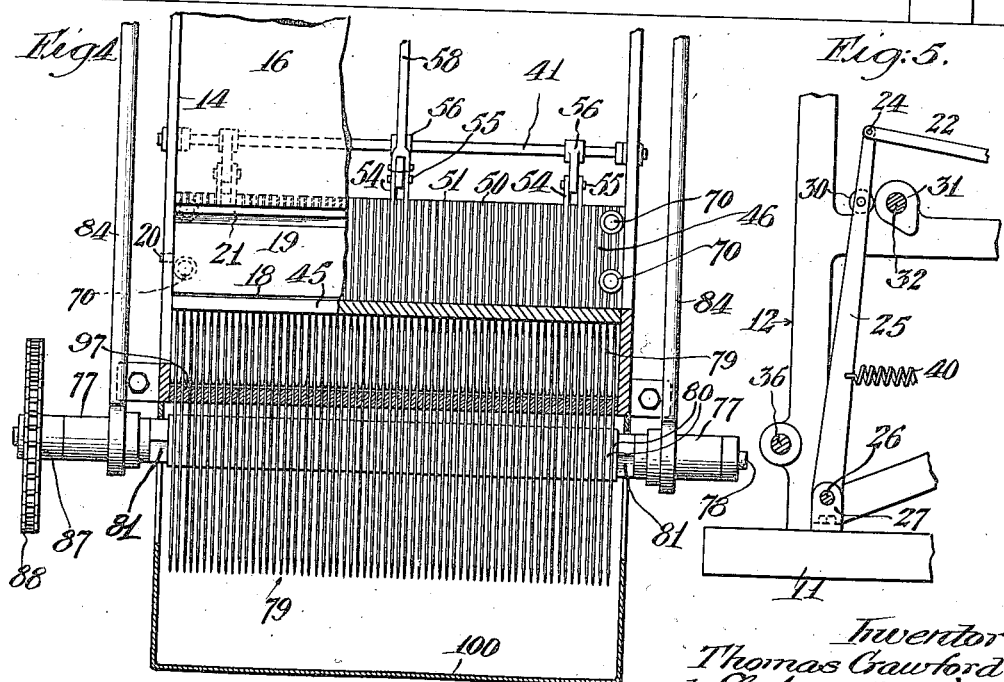
Inventor
Thomas Crawford.
by Graham Harris
Attorneys

UNITED STATES PATENT OFFICE.

THOMAS CRAWFORD, OF ANAHEIM, CALIFORNIA, ASSIGNOR TO THOMAS CRAWFORD, INC., A CORPORATION OF CALIFORNIA.

FRUIT-SLICING MACHINE.

1,259,213.  Specification of Letters Patent.  Patented Mar. 12, 1918.

Application filed November 13, 1917. Serial No. 201,857.

*To all whom it may concern:*

Be it known that I, THOMAS CRAWFORD, a citizen of the United States, residing at Anaheim, in the county of Orange and State of California, have invented a new and useful Fruit-Slicing Machine, of which the following is a specification.

In the manufacture of marmalades and jellies from fruit such as oranges, it is particularly desirable to cut the fruit into small particles in such a manner that a minimum amount of juice is liberated from the fruit during the cutting operation, and one of the principal objects of my invention is to produce a machine of simple form and construction for slicing oranges and similar fruits.

A further object of my invention is to produce a machine of the class described in which the fruit is cleanly cut into thin slices in such a manner that a minimum amount of the juices are liberated from the fruit during the slicing operation.

Other objects and advantages will appear hereinafter from the following description.

Referring to the drawings, which are for illustrative purposes only,

Figure 1 is a side elevation of a machine embodying a form of my invention.

Fig. 2 is an end view of the machine shown in Fig. 1, the guard over the cutter being removed therefrom.

Fig. 3 is a longitudinal vertical sectional view of the machine shown in Fig. 1.

Fig. 4 is a plan view partly in section of one end of the machine.

Fig. 5 is a fragmentary elevation of part of the operation mechanism.

Fig. 6 is an enlarged plan view of a portion of the comb, and

Fig. 7 is a detail sectional view of a part of the cutter.

The machine is preferably supported on a platform indicated at 11 to which the frame 12 of the machine is secured by means of suitable bolts 13. The frame consists preferably of two side members 14 connected by means of a cross-bar 15 and having supported therebetween an inclined table 16. The table 16 is inclined downwardly and inwardly toward the cutting device and is provided with an opening 18 extending therethrough in which is pivotally mounted a gate 19, the gate being provided with supporting pins 20 which extend through the respective side members 14. The gate 19 is provided with an upward extension or wall 21 which is arranged to intermittently feed the fruit to the cutting device as hereinafter more fully described.

22 designates a link having one end pivotally connected at 23 to the gate 19 and the other end pivotally connected at 24 to an arm 25, the arm 25 being pivotally mounted on a pin 26 supported in suitable brackets 27 on the platform 11. 30 designates a roller mounted on the arm 25 which is adapted to be engaged by a cam 31 mounted on a shaft 32 journaled on the frame 12. The shaft 32 is provided with a sprocket wheel 33 driven by means of a sprocket chain 34 from a sprocket wheel 35 mounted on a shaft 36, the shaft 36 being provided with driving pulley 37 adapted to be driven from any suitable power source, not shown. The roller 30 on the arm 25 is kept in engagement with the cam 31 by means of a coiled spring 40, one end of which is secured to the arm 25 and the other end of which is secured to a shaft 41 mounted in any suitable manner in the frame of the machine.

45 designates a vertically arranged cutting board which forms a continuation of the inner end of the inclined table 16, the cutting board being suitably mounted upon the frame of the machine.

Horizontally slidable under the cutting board 45 is a comb 46, said comb being slidably mounted on a roller 47 mounted upon a shaft 48. The comb consists of a series of teeth 50 spaced apart by plates 51, the teeth and plates being secured together by means of suitable rods 52. The comb is mounted in the machine so that when the comb is in its extreme forward position the inner edges of the plates 51 are substantially parallel with the inner face of the cutting board 45. Certain of the teeth 50 extend rearwardly from the comb proper as indicated at 54 in which are mounted pins 55 which are pivotally engaged by means of arms 56, such arms being mounted to swing upon the shaft 41.

58 designates a link, the forward end of which is pivotally connected by means of a pin 59 to one of the arms 56, the other end of the link 58 being pivotally connected by means of a pin 60 to a lever 61, the lever 61 being pivotally mounted on a pin 62 mounted in suitable brackets 63 on the platform 11. Mounted on the upper end of the lever 61 is a roller 64 which extends into the groove 65 of an internal cam 66, such cam being mounted upon a shaft 32 which is driven as heretofore described. 70—70 designate rollers mounted on the comb which engage the respective side members 14 to permit a free movement of the comb therebetween.

72 designates an oscillating frame mounted upon a shaft 73 journaled in suitable bearings 74 secured to the platform 11. The oscillating frame 72 is provided with two upwardly extending arms 75 to the upper end of each of which is secured by means of a suitable bolt 76 a journal member 77 in which is mounted a shaft 78. Mounted on the shaft 17 is a series of disk knives 79 spaced apart by means of collars 80 and held in place upon the shaft by means of suitable nuts 81. The shaft 78 together with the knives thereon is oscillated back and forth by means of two arms 84, the forward ends of which engage the shaft 78 and the rear ends of which are connected by pins 85 to wrist plates 86, such wrist plates being secured to the shaft 32. The shaft 78 is rotated through the medium of a sprocket wheel 87 secured thereon, which sprocket wheel is driven by means of a chain sprocket wheel 89 on the shaft 88 from a sprocket wheel 89 on the shaft 73. The shaft 73 is driven by means of a sprocket wheel 90 secured thereto which in turn is driven by a sprocket chain 91 from a sprocket wheel 92 on the shaft 36.

Mounted between the cross-bar 15 and a cross-bar 95 is a stripper 96 which consists of a series of vertically arranged blades 97, there being one blade between each pair of cutting disks 79. 100 designates a guard or cover for the cutter, the same being secured in any suitable manner to the cross-bars 15 and 95, the guard inclosing the cutting mechanism as clearly shown in Figs. 1 and 3. 102 designates a hopper through which the sliced material may be delivered from the machine to any suitable receptacle not shown.

The machine operates in the following manner:

The fruit, in the present case indicated as oranges 105, is placed upon the table 16 and rolls downwardly thereover against the wall 21 of the gate 19, that is the gate being in the dotted line position shown in Fig. 1. As the gate is swung or tilted into the full line position shown in Fig. 1 through the medium of the link 22 and the arm 25, a row of fruit falls upon the gate as indicated at 106 in Fig. 1 where it is held from further downward movement by the lower raised edge of the gate. The gate is then returned to the dotted line position, when the row of fruit on the gate is delivered over the upper edges of the cutting board 45 to the comb 46 at which time the cutter blades on the oscillating frame 72 are in the dotted line position shown in Fig. 1. As the fruit falls upon the comb the blades advance into the full line position shown in Fig. 1 through the medium of the rods 84 which are operated by means of the wrist plates 86 as heretofore described, the cutting disks at the same time rotating in the direction of the arrow shown upon the disk in Fig. 1.

This forward movement of the disks or blades cuts the fruit into a series of very thin slices and as the cutting operation is substantially completed the comb 46 moves rearwardly into the dotted line position shown in Fig. 1 as the cutting disks move away from the cutting board. The movement of the comb tends to turn the fruit on the comb during such rearward movement so that should any part of the fruit adjacent to the cutting board be uncut such turning movement of the fruit brings the uncut portion into contact with the cutting disks as they move away from the cutting board thereby insuring that all of the fruit is cut entirely through.

The sliced fruit, when the support of the comb 46 has been removed, falls into the hopper 102 and in the event that any of the fruit remains between the cutter blades, the stripper 96 strips such fruit from between the blades causing the same to fall into the discharge hopper. After the fruit on the comb has been discharged into the hopper 102 the gate is operated as heretofore described to deliver another row of fruit to the comb and the operation repeated as above described.

By the use of the machine above described, fruit, such as oranges, is cut quickly and cleanly into a number of very thin slices in which condition the fruit may be readily cooked and prepared for the manufacture of marmalades, jellies and similar products. It is understood that while I have particularly described my invention as being applicable to the cutting of oranges that the same may be used for cutting other edibles, that is other kinds of fruit and vegetables.

What I claim is:

1. A fruit slicing machine comprising a table, a vertically arranged cutting board, forming a continuation of the lower end of said table, means for supporting the fruit against the cutting board, a series of rotatable knives movable through the fruit, a stripper arranged to remove the fruit from the knives, and a gate mounted in said table for intermittently feeding the fruit from the table to the cutting board.

2. A fruit slicing machine comprising a table, a cutting board, means for supporting the fruit against the cutting board, a series of rotatable knives movable through the fruit, a stripper arranged to remove the fruit from the knives, and means for intermittently feeding the fruit from the table to the cutting board, said last named means consisting of a pivoted gate, a wall formed on the gate and means for moving the gate to receive a row of fruit thereon.

3. A fruit slicing machine comprising an inclined table, a cutting board, a movable comb for supporting the fruit against the board, means for feeding fruit from the table to the comb, and a cutter for slicing the fruit on the comb, said cutter comprising a series of knives, and means for moving the knives to cause the knives to enter the comb.

4. A fruit slicing machine comprising a table, a comb, means for intermittently feeding fruit from the table to the comb, an oscillating frame, a shaft rotatably mounted on the frame, a series of disk cutters mounted on the shaft, and means for moving said frame to cause the cutters to enter the comb and cut the fruit thereon.

5. A fruit slicing machine comprising a table, a comb, means for intermittently feeding fruit from the table to the comb, an oscillating frame, a shaft rotatably mounted on the frame, a series of disk cutters mounted on the shaft, means for oscillating the frame to enter the comb and cut the fruit thereon, and means for moving the comb away from the cutters as the cutters move away from the comb.

6. A fruit slicing machine comprising a table, a comb, means for intermittently feeding fruit from the table to the comb, an oscillating frame, a shaft rotatably mounted on the frame, a series of disk cutters mounted on the shaft, means for moving said frame to cause the cutters to enter the comb and cut the fruit thereon, and a series of stationary bars between the cutters arranged to strip the fruit therefrom.

7. A fruit slicing machine comprising an inclined table having an opening therein at its lower end, a cutting board at the lower edge of the table, a comb slidably mounted under the cutting board, a pivotally mounted gate in said opening in the table, means for operating the gate to intermittently feed fruit from the table to the comb, an oscillating frame, a shaft carried on said frame, a series of cutter disks mounted on said shaft, means for operating said frame to cause the cutter disks to enter the comb and slice the fruit thereon, means for retracting the comb after the cutting operation, and a stripper for said disks consisting of a series of stationary strips arranged between the cutter disks.

In testimony whereof, I have hereunto set my hand at Anaheim, California, this 7th day of November, 1917.

THOMAS CRAWFORD.